US008903548B2

(12) United States Patent
Galm et al.

(10) Patent No.: US 8,903,548 B2
(45) Date of Patent: Dec. 2, 2014

(54) POSITION FINDING SYSTEM

(75) Inventors: Timo Galm, Mudau (DE); Thomas Freund, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 224 days.

(21) Appl. No.: 13/327,278

(22) Filed: Dec. 15, 2011

(65) Prior Publication Data

US 2012/0153089 A1 Jun. 21, 2012

Related U.S. Application Data

(60) Provisional application No. 61/423,949, filed on Dec. 16, 2010.

(51) Int. Cl.
*G06F 19/00* (2011.01)
*B61L 3/12* (2006.01)
*B61L 25/02* (2006.01)
*G05D 1/02* (2006.01)

(52) U.S. Cl.
CPC ............ B61L 3/125 (2013.01); B61L 25/025 (2013.01); *G05D 1/0265* (2013.01); *G05D 1/028* (2013.01)
USPC ........... 700/245; 701/466; 701/514; 701/300; 701/408; 701/469; 700/253; 700/258

(58) Field of Classification Search
None
See application file for complete search history.

(56) References Cited

U.S. PATENT DOCUMENTS

| | | | | |
|---|---|---|---|---|
| 3,734,229 A | * | 5/1973 | Comer | 180/168 |
| 4,137,984 A | * | 2/1979 | Jennings et al. | 180/19.1 |
| 4,229,646 A | * | 10/1980 | Burkhardt et al. | 377/3 |
| 4,530,056 A | * | 7/1985 | MacKinnon et al. | 701/25 |
| 4,742,283 A | * | 5/1988 | Bolger et al. | 318/587 |
| 4,990,841 A | * | 2/1991 | Elder | 318/587 |
| 5,204,814 A | * | 4/1993 | Noonan et al. | 701/25 |
| 5,650,703 A | * | 7/1997 | Yardley et al. | 318/587 |
| 6,377,888 B1 | * | 4/2002 | Olch | 701/505 |
| 6,452,504 B1 | * | 9/2002 | Seal | 340/572.2 |
| 6,478,229 B1 | * | 11/2002 | Epstein | 235/492 |
| 6,618,022 B2 | * | 9/2003 | Harvey | 343/876 |
| 6,693,511 B1 | * | 2/2004 | Seal | 340/10.1 |
| 6,750,769 B1 | * | 6/2004 | Smith | 340/572.1 |
| 6,975,229 B2 | * | 12/2005 | Carrender | 340/572.4 |
| 7,164,353 B2 | * | 1/2007 | Puleston et al. | 340/514 |

(Continued)

FOREIGN PATENT DOCUMENTS

DE  27 32 954 B1  11/1978
DE  10 2006 004 938 A1  8/2007

(Continued)

*Primary Examiner* — Thomas Tarcza
*Assistant Examiner* — Richard Goldman
(74) *Attorney, Agent, or Firm* — Muncy, Geissler, Olds & Lowe, P.C.

(57) ABSTRACT

Position finding system having a sensor unit and a transmitter unit. The sensor unit comprises a first RFID transponder reader unit, a first inductive detector unit, and an analysis unit connected to the RFID transponder reader unit and the inductive detector unit; the transmitter unit comprises an RFID transponder and a metallic material. The sensor unit is movable relative to the transmitter unit. The RFID transponder reader unit is configured for absolute position finding and outputs a first position value, and the inductive detector unit is configured for absolute position finding and outputs a second position value. The analysis unit is configured to determine, from the data acquired from the transmitter unit, an absolute position of the sensor unit from the first and second position values.

13 Claims, 1 Drawing Sheet

(56) References Cited

U.S. PATENT DOCUMENTS

| | | | |
|---|---|---|---|
| 7,245,121 B2 | 7/2007 | Freund et al. | |
| 7,269,480 B2* | 9/2007 | Hashimoto et al. | 700/259 |
| 7,272,502 B2* | 9/2007 | Lee et al. | 701/472 |
| 7,426,424 B2 | 9/2008 | Moriguchi | |
| 8,370,985 B2* | 2/2013 | Schnittman et al. | 15/41.1 |
| 8,396,661 B2* | 3/2013 | Wong et al. | 701/472 |
| 8,406,949 B2* | 3/2013 | Kondo | 701/23 |
| 8,417,383 B2* | 4/2013 | Ozick et al. | 700/258 |
| 2002/0129508 A1* | 9/2002 | Blattner et al. | 33/706 |
| 2004/0111911 A1 | 6/2004 | Scannell | |
| 2005/0012619 A1* | 1/2005 | Sato | 340/572.8 |
| 2007/0074416 A1* | 4/2007 | Reusing | 33/706 |
| 2009/0195358 A1* | 8/2009 | Vennelakanti et al. | 340/10.1 |
| 2009/0261951 A1* | 10/2009 | Chang et al. | 340/10.1 |
| 2010/0030379 A1* | 2/2010 | Parlantzas et al. | 700/253 |
| 2010/0141244 A1 | 6/2010 | Bartos et al. | |
| 2010/0308803 A1* | 12/2010 | Schaeuble et al. | 324/207.15 |
| 2010/0315259 A1* | 12/2010 | Galm et al. | 340/825.49 |
| 2011/0254667 A1* | 10/2011 | Popescu | 340/10.42 |

FOREIGN PATENT DOCUMENTS

| | | |
|---|---|---|
| DE | 20 2007 004 717 U1 | 9/2008 |
| DE | 10 2008 044 739 A1 | 3/2009 |
| EP | 0 294 154 A2 | 12/1988 |
| EP | 0 472 028 A2 | 2/1992 |
| EP | 1 577 188 A2 | 9/2005 |
| EP | 1 770 373 A2 | 4/2007 |
| WO | WO 2005/012840 | 2/2005 |
| WO | WO 2005/052842 | 6/2005 |
| WO | WO 2008/101702 | 8/2008 |

\* cited by examiner

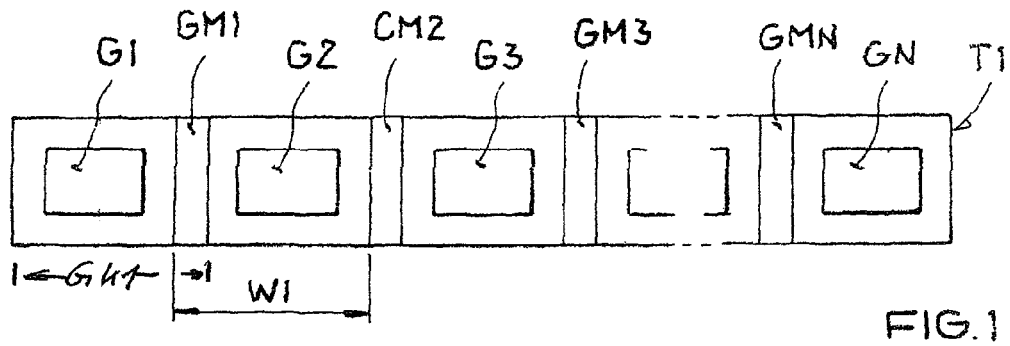
FIG. 1
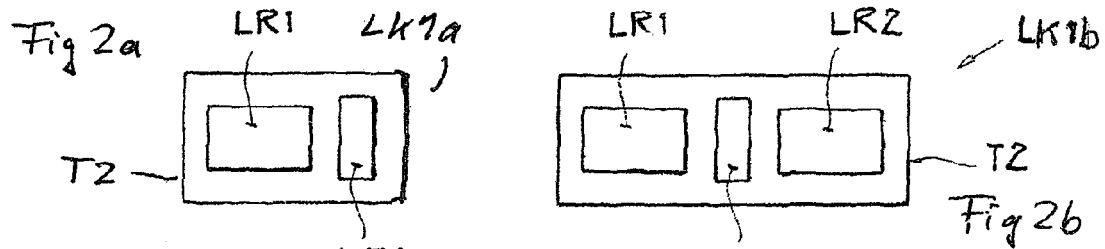
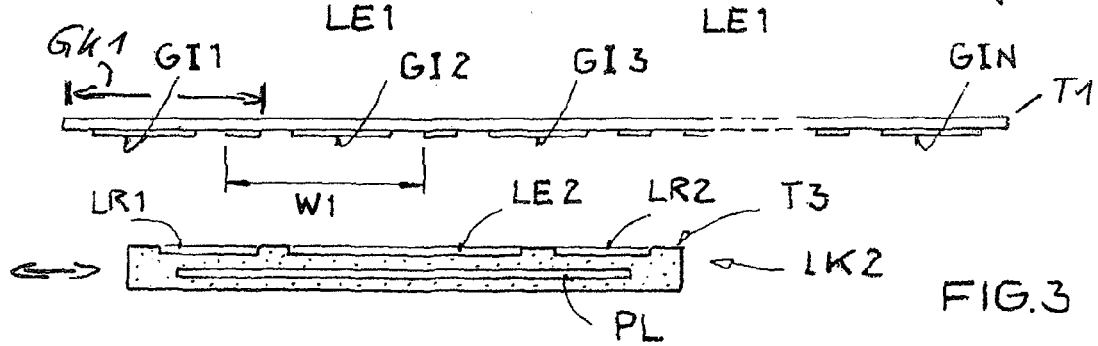
FIG. 3
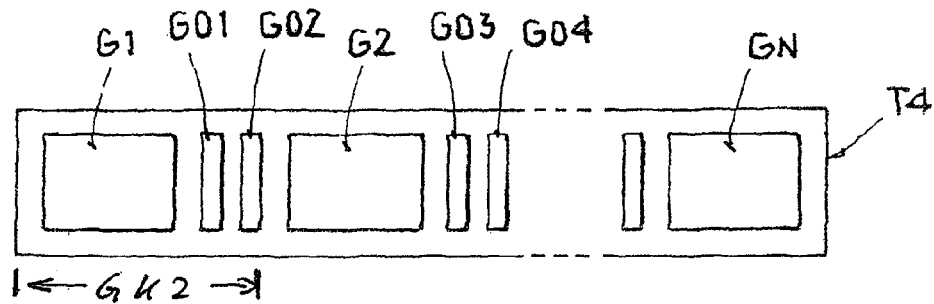
FIG. 4
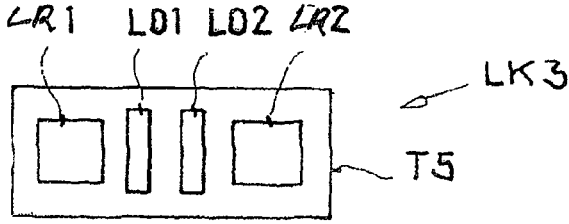
FIG. 5

POSITION FINDING SYSTEM

This nonprovisional application claims priority to U.S. Provisional Application No. 61/423,949, which was filed on Dec. 16, 2010, and which is herein incorporated by reference.

BACKGROUND OF THE INVENTION

1. Field of the Invention

The invention relates to a position finding system, a use of the position finding system, and a method for determining position.

2. Description of the Background Art

Such a system is known from DE 10 2006 004 938 A1. The position finding system described therein is used for determining the position of a vehicle, for example. RFID transponders are used by preference for this purpose. Another position finding system is known from WO 2008/101702, which corresponds to US 2010/0141244. There, the induction in a sensor from a magnet located on a wheel is sensed in order to determine the position of the wheel. Another position finding system is known from DE 10 2008 044 739 A1, which corresponds to US 2010/0308803, and in which the position of a first object relative to a second object is determined by means of an inductive linear encoder. To this end, a sensor unit travels at close range past a marking section designed as a transmitter unit, wherein the marking section has a plurality of sections of metallic material of different widths. The sections of metallic material of different widths produce different intensities of induction. Another device and method for determining position is known from WO 2005/012840, which corresponds to U.S. Pat. No. 7,245,121. Using the method described therein, a sensor is used to analyze the induction produced in the sensor by permanent magnets, wherein the sensor unit located in a read head is capable of detecting the induction from multiple magnets at once.

In addition, a roller used in printing as a transmitter unit is known from DE 20 2007 004 717 U1, which roller also has an RFID transponder in addition to a magnet as reference mark. By means of the RFID transponder, the roller data stored on the transponder are read by the sensor unit, while the rotary position of the roller can be determined by means of the reference mark.

Another position finding system is known from EP 0 472 028 A2. There, RFID marks on a carrier device are detected by means of an RFID reader unit in order to cause directional changes or stops of the carrier device. In addition, an inductively operating detector unit is used to detect a deviation from a preferred direction. Additional systems are known from EP 1 577 188 A2, which corresponds to U.S. Pat. No. 7,426,424, and EP 1 770 373 A2, which corresponds to US 2007/074416, and US 2002/129508 A1. Moreover, a position finding system is also known from WO 2005/052842.

It is a disadvantage in the prior art position finding systems that the position cannot be determined immediately at any point in time, and/or the position finding systems are costly to manufacture and use, in particular in crane systems in port areas, for example, when the crane must traverse distances of several 100 m and the exact position must be determined at the same time. This also applies to use as a rotary encoder for rings with diameters larger than several meters.

SUMMARY OF THE INVENTION

It is therefore an object of the invention to provide a position finding system, and to provide a use of such a system, and to provide a method for position finding, each of which reduces the disadvantages of the prior art.

According to an embodiment of the invention, a position finding system having a sensor unit and a transmitter unit is provided, in which the sensor unit comprises a first RFID transponder reader unit, a first inductive detector unit, and an analysis unit connected to the RFID transponder reader unit and inductive detector unit, the transmitter unit comprises an RFID transponder and a component transmitter unit made of a metallic material, the sensor unit is movable relative to the transmitter unit, and the RFID transponder reader unit is configured for absolute position finding and outputs a first position value, and the inductive detector unit is configured for absolute position finding and outputs a second position value, and wherein the analysis unit is configured to determine, from the data acquired from the transmitter unit, an absolute position of the sensor unit from the first and second position values.

According to another embodiment of the invention, a use of the position finding system is disclosed for determining the absolute position along a guide device of a guided vehicle, in particular a rail vehicle, which preferably also can travel on a circular ring.

According to another embodiment of the invention, a method is provided for position finding with a sensor unit that comprises at least one RFID transponder reader unit and at least one inductive detector unit and an analysis unit connected to the RFID transponder reader unit and the inductive detector unit, and with a transmitter unit that comprises an RFID transponder and a component transmitter unit made of a metallic material, wherein a plurality of transmitter units are arranged in a row, and the RFID transponder reader unit outputs a first position value for absolute position finding, and the inductive detector unit outputs a second position value for absolute position finding, and the analysis unit determines, from the position values sensed from the transmitter unit, an absolute position of the sensor unit from the first and second position values.

One advantage of the position finding system according to the invention is that a very reliable and precise position finding system can be provided, in particular in combination with an appropriate transmitter unit that has at least one RFID transponder and a component transmitter unit made of a metallic material. Another advantage of the method of determination is that the absolute position can be determined, in particular immediately after the power supply is switched on, without motion of the reader head. To this end, both the first value and the second value are available to the analysis unit immediately after the power supply is switched on, without the need to perform a motion of the reader head relative to the transmitter unit as is the case with an incremental system, and without referring to a stored value.

Another advantage of such a position finding system is that the precision of the absolute position determination by the reader head is increased through the combined use of two different types of sensors in the reader head or two different types of transmitters, in particular even for distances above 10 m, preferably above 100 m, by the means that the absolute position data can be determined extremely precisely by the reader head from an arrangement of a row of individual transmitter units, namely an RFID transponder and a component transmitter unit made of a metallic material. In this process, the position can be determined for every absolute position from a first value and a second value. The two values are determined in each case by means of an absolute position determination. By this means, the relevant absolute position of the reader head is composed of a first value and a second value. The reader unit and detector unit are preferably implemented along a line extending essentially parallel to a longitudinal axis of the reader head. Investigations by the applicant have shown that the use of RFID transponders creates a simple and reliable way of providing the necessary data to the RFID transponder reader unit. In this regard it is advantageous to use simple and economical passive RFID transponders, which do not have their own power supply. The RFID transponders preferably operate in the range of 125 KHz, extremely preferably in the range of 13.56 MHz, and obtain their energy from the field of the sensor unit. HF RFID transponders, which operate based on backscatter in the range above 800 MHz, can also be used by preference. The individual RFID transponders carry a unique identifier, in particular a position identifier, with the aid of which a position can be associated in the sensor unit with the relevant RFID transponder. This can be done especially simply if the relevant RFID transponder has a sequential number sequence. By this means, the RFID transponder reader unit can easily determine an absolute position from the RFID transponder data, and can additionally determine at least one relative position of the sensor unit with respect to the RFID transponder using the inductive detector unit through the change in induction in the vicinity of a component transmitter unit made of a metallic material; in other words, the position can be determined very precisely from a combination of RFID transponder data and the change in induction caused by a component transmitter unit made of a metallic material. It is a matter of course that metallic materials that produce an especially strong induction in a magnetic field are to be preferred.

In another embodiment, the identifier of the relevant RFID transponder directly contains its absolute position on the rail, so that the first value is read directly out of the RFID transponder without calculations.

Because the position finding system determines the data from the transmitter unit in a contactless manner without optical aids, the system is robust and insensitive to contamination. Moreover, especially when used in safety-related systems, an RFID transponder can be read out in every position, and in this way the absolute position of the reader unit can be determined together with the inductive detector unit without it being necessary to travel to a reference point or store the last position. This is an advantage, especially in the event of a power failure, because an absolute position can be determined immediately upon restoration of power without moving the sensor unit.

In one embodiment, the analysis unit is configured to determine the coarse resolution of the absolute position using the first position value and the fine resolution of the absolute position using the second position value.

In an embodiment, the position finding system, and in particular the analysis unit, is configured to determine the absolute position from the first position value currently output and the second position value currently output. To this end, the sensing of the position values or position data takes place continuously during the motion. By this means, the relevant absolute position can be determined at any time at all points during a motion. Preferably, the analysis unit is configured to determine the coarse resolution of the absolute position using the first position value and the fine resolution of the absolute position using the second position value.

In an embodiment, the sensor unit includes a second RFID transponder reader unit. With an appropriate arrangement, the data from two RFID transponders can be read out by the reader unit, by which means reliability and precision in the determination of the absolute position are increased. Especially if the signal from one RFID transponder is lost, the position can still be determined precisely due to the redundancy in reading. As a result of the redundancy of the sensors arranged on the sensor unit, the sensor unit can be used to particular advantage in safety-related systems. For example, if the inductive detector unit fails, the position can still be determined reliably, albeit perhaps with reduced precision, using one or both RFID transponder reader units.

As a result of the arrangement of a plurality of transmitter units in a row and the creation of an alternating arrangement of RFID transponders and component transmitter units made of a metallic material, the position finding system can preferably also be used for a precise determination of absolute position, even in the case of lengths of several 100 m. Investigations by the applicant have shown that the absolute position can be determined to values smaller than 1 mm.

In another embodiment, at least one, preferably even two or more, component transmitter units can be made of a metallic material to be arranged between two RFID transponders. Furthermore, it is preferred for the transmitter units to be constructed on a flexible carrier material and for the flexible carrier material to be implemented as a tape so that it can be unrolled from a roll.

According to another embodiment, the carrier material can be arranged on a rail, wherein an RFID transponder is placed at the start and at the end of the rail. Investigations by the applicant have shown that the tape, i.e. the transmitter units, can be economically and continuously attached to a rail, for example by means of an adhesive process. If the sensor unit is located on a rail vehicle, the position of the rail vehicle on the rail can be determined simply and reliably. The term rail vehicle includes all guided systems independent of their geometric implementation. In particular, investigations by the applicant have shown that the position finding system according to the invention is preferably also usable in rings with diameters larger than several meters.

In another embodiment, the analysis unit includes an analysis electronics unit to output the position using the data sensed from a transmitter unit. Furthermore, it is preferred for the analysis electronics unit to be located on a circuit board above the sensor units. Furthermore, it is preferred for the sensor unit to include a read head and for the read head to have a length such that at every position of the read head it is possible to sense both the first value of at least one RFID transponder and also the second value, which is obtained by means of induction data from the inductive detector unit resulting from the change in induction of a transmitted magnetic field when eddy currents are induced in the metallic materials implemented as the component transmitter unit.

In an embodiment, the metallic material can also be implemented as permanent magnets. By this means, the transmission of an alternating magnetic field by the inductive detector unit is rendered unnecessary. Instead, a Hall sensor is required for detection of the magnetic field.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a top view of a first embodiment of an arrangement of a plurality of transmitter units in a row, FIG. 2a is a top view of a first embodiment of a read head, FIG. 2b is a top view of an alternative embodiment of a read head, FIG. 3 is a side view of a position finding system according to the invention, FIG. 4 is a top view of a second embodiment of an arrangement of a plurality of transmitter units in a row, and FIG. 5 is a top view of a second embodiment of a reader unit.

DETAILED DESCRIPTION

The illustration in FIG. 1 shows a top view of a first schematic embodiment of a row of transmitter units arranged on a first carrier T1. The first carrier T1 preferably is implemented as a flexible tape that preferably can be unrolled from a roll. A first transmitter unit GK1 having an RFID transponder G1 and a component transmitter unit GM1 made of a metallic material. Correspondingly, the subsequent transmitter units comprise an RFID transponder G2 and a component transmitter unit GM2 made of a metallic material or an RFID transponder G3 and a component transmitter unit GM3 made of a metallic material, and the last transmitter unit, an RFID transponder GMN-1 and a component transmitter unit GMN-1 made of a metallic material. The arrangement in a row of transmitter units, which represents an alternating arrangement of RFID transponders and the component transmitter units made of a metallic material, is terminated by an RFID transponder GN. The length of a transmitter unit is W1, and simultaneously represents the repeat dimension in the arrangement of the transmitter units in a row. So that the repeat dimension is as unchanging as possible from transmitter unit to transmitter unit, and so that the precision of the position determination is not adversely affected, the tape should be designed to have as little elasticity as possible in the longitudinal direction.

The illustration in FIG. 2a shows a top view of a schematic embodiment of a read head with a sensor unit LK1a. The sensor unit LK1 comprises a first RFID transponder reader unit LR1 and a first inductive detector unit LE1. In addition, the reader units are arranged on a subassembly carrier T2.

The illustration in FIG. 2b shows a top view of a schematic alternative embodiment of a read head with a sensor unit LK1b. The sensor unit LK1b comprises the first RFID transponder reader unit LR1, the first inductive detector unit LE1, and a second RFID transponder reader unit LR2.

The illustration in FIG. 3 shows a schematic side view of a position finding system according to the invention, having an arrangement of transmitter units in a row, as already explained in connection with the drawing for FIG. 1, and having a read head with a second sensor unit LK2 with the first RFID transponder reader unit LR1 and a first inductive detector unit LE2 and the second RFID transponder reader unit LR2 arranged on a subassembly carrier T3. In addition, the sensor unit LK2 includes a circuit board PL, likewise arranged on the subassembly carrier T3, for accommodating an analysis electronics unit. The spacing of the sensor unit LK2 from the transmitter units located on the top of the first carrier T1 is chosen such that the data from the RFID transponders and the change in induction resulting from the component transmitter units made of a metallic material are reliably sensed. The spacing preferably is in the range from a few mm to some cm. In addition, the sensor unit LK2 is movable relative to the row arrangement of the transmitter units.

The illustration in FIG. 4 shows a top view of a second schematically represented embodiment of an arrangement of transmitter units in a row, which are constructed on a carrier T4. Described below are only the differences from the first embodiment discussed in connection with the description of the illustration in FIG. 1. Accordingly, a transmitter unit GK2 includes the transponder G1 and two successive component transmitter units G01 and G02 made of a metallic material. The spacings between the component transmitter units are chosen such that the sensor unit can achieve the best possible spatial resolution.

A top view of a second schematically represented embodiment of a read head with a third sensor unit LK3, located on a subassembly carrier T5, is shown in the illustration in FIG. 5. Described below are only the differences from the first embodiment discussed in connection with the description of the illustration in FIG. 2. Accordingly, the third sensor unit LK3 includes a first inductive detector unit L01 and a second inductive detector unit L02. The two inductive detector units L01 and L02 are implemented between the two RFID transponder reader units LR1 and LR2. The arrangement of the two inductive detector units L01 and L02 is especially adapted to the second embodiment of a transmitter unit, shown in FIG. 4, in order to sense the two component transmitter units made of a metallic material that are located between the RFID transponders.

Furthermore, the third sensor unit LK3 can also be used for the embodiment of a transmitter unit with only a single component transmitter unit made of a metallic material located between two RFID transponders. In like manner, the sensor unit LK2 or LK1 can also be used for the transmitter unit explained in connection with the drawing for FIG. 4.

It is a matter of course that a rectangular design is preferred for the geometric design of the read head and sensor unit in which the reader unit and detector unit are arranged on a line that is essentially parallel to the longitudinal axis of the read head. The longitudinal axis, in turn, extends in the direction of the row of transmitter units.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A position finding system comprising:
    a sensor unit having a first RFID transponder reader unit, a first inductive detector unit, and an analysis unit connectable to the first RFID transponder reader unit and the first inductive detector unit; and
    a transmitter unit having an RFID transponder and a component transmitter unit that is made of a metallic material, the sensor unit being configured to be movable relative to the transmitter unit,
    wherein the first RFID transponder reader unit is set up for absolute position determination and outputs a first position value,
    wherein the first inductive detector unit is set up for absolute position determination and outputs a second position value,
    wherein the analysis unit is configured to determine, from data acquired from the transmitter unit, an absolute position of the sensor unit relative to the transmitter unit based on the first and second position values, and wherein the analysis unit is configured to determine a coarse resolution of the absolute position using the first position value and subsequently a fine resolution of the absolute position using the second position value based on a change in induction of the component transmitter unit detected by the first inductive detector unit, and wherein the fine resolution is more refined than the coarse resolution.

2. The position finding system according to claim 1, wherein the analysis unit is configured to determine the absolute position from the first position value currently output and the second position value currently output.

3. The position finding system according to claim 1, wherein the first RFID transponder reader unit and the first inductive detector unit are arranged along a line that extends in the same direction as the direction in which a longitudinal axis of the transmitter unit extends.

4. The position finding system according to claim 1, wherein the sensor unit additionally includes a second RFID transponder reader unit.

5. The position finding system according to claim 1, wherein the transmitter unit comprises a plurality of transmitter units, the plurality of transmitter units are arranged in a row, and the RFID transponders and component transmitter units made of a metallic material are arranged in an alternating manner.

6. The position finding system according to claim 5, wherein at least one component transmitter unit made of a metallic material is arranged between two RFID transponders.

7. The position finding system according to claim 1, wherein the transmitter unit is constructed on a flexible carrier material.

8. The position finding system according to claim 7, wherein the flexible carrier material is a tape and is configured to be unrolled from a roll.

9. The position finding system according to claim 7, wherein the flexible carrier material is arranged on a rail, wherein an RFID transponder is placed at a start and at an end of the rail.

10. The position finding system according to claim 1, wherein the sensor unit is located on a rail vehicle.

11. The position finding system according to claim 1, wherein the absolute position is determined along a guide device of a guided vehicle or a rail vehicle.

12. A method for determining an absolute position, the method comprising:
providing a sensor unit having at least one RFID transponder reader unit, an inductive detector unit, and an analysis unit connectable to the RFID transponder reader unit and the inductive detector unit;
providing a plurality of transmitter units each having an RFID transponder and a component transmitter unit made of a metallic material, the plurality of transmitter units being arranged in a row;
outputting a first position value by the RFID transponder reader unit of one of the plurality of transmitter units for absolute position finding;
detecting a change in induction of the component transmitter unit using the first inductive detector unit;
outputting a second position value based on the detected change in induction of the component transmitter unit for absolute position finding; and
determining an absolute position of the sensor unit relative to the one of the plurality of transmitter units via the analysis unit from position values acquired from the transmitter unit based on the first and second position values,
wherein a coarse resolution of the absolute position is determined by the analysis unit using the first position value and a fine resolution of the absolute position is subsequently determined by the analysis unit using the second position value, and
wherein the fine resolution is more refined than the coarse resolution.

13. The method for determining the absolute position according to claim 12, wherein the absolute position is determined by the analysis unit from the first position value currently output and the second position value currently output.

* * * * *